(12) United States Patent
Hughes et al.

(10) Patent No.: US 6,674,047 B1
(45) Date of Patent: Jan. 6, 2004

(54) WIRE ELECTRODE WITH CORE OF MULTIPLEX COMPOSITE POWDER, ITS METHOD OF MANUFACTURE AND USE

(75) Inventors: Joseph Paul Hughes, Shamokin-Dam, PA (US); David John Urevich, Palmer, PA (US)

(73) Assignee: Concept Alloys, L.L.C., Farmington Hills, MI (US)

( * ) Notice: Subject to any disclaimer, the term of this patent is extended or adjusted under 35 U.S.C. 154(b) by 0 days.

(21) Appl. No.: 09/711,454

(22) Filed: Nov. 13, 2000

(51) Int. Cl.⁷ .............................................. B23K 35/02
(52) U.S. Cl. .............................. 219/145.22; 219/146.31
(58) Field of Search ........................ 219/145.22, 145.1, 219/146.1, 146.31; 75/252

(56) References Cited

U.S. PATENT DOCUMENTS

| | | | |
|---|---|---|---|
| 3,534,390 A | * 10/1970 | Woods et al. | ............... 219/146 |
| 3,834,002 A | * 9/1974 | Sissons et al. | ............. 29/420.5 |
| 3,841,901 A | * 10/1974 | Novinski et al. | ........ 117/105.2 |
| 4,048,705 A | 9/1977 | Blanpain et al. | |
| 4,137,446 A | 1/1979 | Blanpain et al. | |
| 4,203,188 A | 5/1980 | Blanpain et al. | |
| 4,305,197 A | 12/1981 | Puschner et al. | |
| 4,331,857 A | 5/1982 | Crisci et al. | |
| 4,370,367 A | * 1/1983 | Novinski et al. | ........... 427/423 |
| 4,379,811 A | 4/1983 | Puschner et al. | |
| 4,396,822 A | 8/1983 | Kishida et al. | |
| 4,668,852 A | 5/1987 | Fox et al. | |
| 4,741,974 A | * 5/1988 | Longo et al. | ............... 428/558 |
| 4,800,131 A | 1/1989 | Marshall et al. | |
| 5,019,686 A | 5/1991 | Marantz | |
| 5,230,729 A | 7/1993 | McCandlish et al. | |
| 5,294,462 A | * 3/1994 | Kaiser et al. | ............... 427/446 |
| 5,352,269 A | 10/1994 | McCandlish et al. | |
| 5,358,695 A | 10/1994 | Helble et al. | |
| 5,369,241 A | 11/1994 | Taylor et al. | |
| 5,374,612 A | 12/1994 | Ito et al. | |
| 5,453,599 A | 9/1995 | Hall, Jr. | |
| 5,468,295 A | 11/1995 | Marantz et al. | |
| 5,472,477 A | 12/1995 | Konig | |
| 5,479,690 A | 1/1996 | Hall, Jr. | |
| 5,514,350 A | 5/1996 | Kear et al. | |
| 5,514,422 A | 5/1996 | McCune | |
| 5,592,927 A | 1/1997 | Zaluzec et al. | |

(List continued on next page.)

FOREIGN PATENT DOCUMENTS

DE     3542663     * 12/1985

OTHER PUBLICATIONS

Tafa Incorporated, Tafa Arc Spray Iron–Chrome–Aluminum Wire—26CA, 1992, Concord, N.H.—USA.

P. Siitonen, T. Konos, P.O. Kettunen, Tampere University of Technology Tampere, Finland, Corrosion Properties Of Stainless Steel Coatings Made By Different Methods Of Therman Spraying, Proceedings of the 7th National Thermal Spray Conference, Jun. 20–24, 1994, Boxton, MA.

PCI Energy Services, PCI's Mechanized GMAW System A Boiler Tube Renewal System, Nov., 1996.

Stephen French, Kirk Rumbaugh, Philip N. Hulsizer, Michael J. Jirinec, Danny Stamper, Fireside Corrosion–Erosion Mitigation Via The Application Of Weld Metal Overlay, Dec. 1996.

(List continued on next page.)

*Primary Examiner*—M. Alexandra Elve
(74) *Attorney, Agent, or Firm*—Brooks Kushman P.C.

(57) ABSTRACT

A cored wire electrode with a sheath and a multiplex powder composite for use in a thermal spray or welding apparatus. The composite comprises micron-sized particles and submicron sized particles, including nano-scale particles, the particles mechanically cooperating to promote smooth powder flow, which facilitates compaction of the cored wire electrode. The invention also includes a method of manufacture of the cored wire electrode and its method of use.

15 Claims, 1 Drawing Sheet

U.S. PATENT DOCUMENTS

| | | |
|---|---|---|
| 5,613,998 A | 3/1997 | Seegopaul et al. |
| 5,651,808 A | 7/1997 | McCandlish et al. |
| 5,714,205 A | 2/1998 | Marantz et al. |
| 5,728,197 A | 3/1998 | Seegopaul et al. |
| 5,776,264 A | 7/1998 | McCandlish et al. |
| 5,808,270 A | 9/1998 | Marantz et al. |
| 5,820,939 A | 10/1998 | Popoola et al. |
| 5,824,992 A | 10/1998 | Nagarajan et al. |
| 5,841,045 A | 11/1998 | McCandlish et al. |
| 5,851,507 A | 12/1998 | Pirzada et al. |
| 5,857,141 A | 1/1999 | Keegan et al. |
| 5,869,019 A | 2/1999 | Seegopaul |
| 5,876,683 A | 3/1999 | Glumac et al. |
| 5,882,376 A | 3/1999 | Kim et al. |
| 5,885,372 A | 3/1999 | Seegopaul |
| 5,919,428 A | 7/1999 | Gao et al. |
| 5,935,458 A | 8/1999 | Trapani et al. |
| 5,938,944 A | 8/1999 | Baughman et al. |
| 5,990,028 A | 11/1999 | Roethlingshoefer et al. |
| 6,025,034 A | 2/2000 | Strutt et al. |

OTHER PUBLICATIONS

Dr. J. J. K. Stekly, Mr. T. Molz, In Situ Weldcladding Of Abraded Boiler Tube Walls: Materials And Programmable Portable Equipment, Dec. 1996.

George Y. Lai, Modern Weld Overlay Technology For Life Extension Of Processing Vessels & Boiler Tubes, Amoco Welding Technology Conference, Nov. 3–5, 1997.

Dr. George Lai, Sam Kiser, Larry Paul, Rusty Martin, Alloy Overlay Selection In Waste–To–Energy Boilers, pp. 1–9, Feb. 19, 1998.

Coating Solutions, National Thermospray, Inc. & Associated Wear Coatings Inc., http://www.hvof.com/material.htm, pp. 1–51, Aug. 17, 2000.

Thermal Spray Technology Glossary, http://www.asm–intl.org/tss/glossary/a.htm, Aug. 29, 2000.

Herbert Herman, Robert A. Sulit, Thermal Spray Coatings, ASM Handbook, vol. 6, pp. 1–11, Sep. 1, 2000.

Philip N. Julsizer, Problems And Solutions In Applying Weld Overlay To Waste Boiler Incinerators, Corrosion 91, The Nance Annual Conference And Corrosion Show, Cincinnati, OH, Mar. 11–15, 1991.

Jim Szmania, Trashburners, Inco Alloys International, Welding Products Company.

* cited by examiner

US 6,674,047 B1

WIRE ELECTRODE WITH CORE OF MULTIPLEX COMPOSITE POWDER, ITS METHOD OF MANUFACTURE AND USE

TECHNICAL FIELD

This invention relates to a wire electrode with a sheath that contains a core of a composite powder core for use primarily in thermal spraying and welding processes, the preparation of the cored wire, and method of using it.

BACKGROUND ART

The problems of wear and corrosion of metallic surfaces, such as the inside of industrial boilers, may be ameliorated by a judicious application of a protective coating. Such coatings generally require chemical compatibility with the substrate, compatibility in thermal expansion coefficients, low porosity, and good adhesion. When the coating is applied, a coating process must be selected to be compatible with the substrate, its topography, surface curvature, and satisfy constraints imposed by line-of-sight limitations, while maintaining a desired thickness and avoiding thermal distortion of the coating and substrate. Additional detail is found in such sources as R. W. Smith, "Thermal Spray Technology-Equipment And Theory", ASM INTERNATIONAL (1992) and T. J. Mursell & A. J. Sturgeon, "Thermal Spraying of Amorphous and Nanocrystalline Metallic Coatings", WORLD CENTER FOR MATERIALS JOINING TECHNOLOGY, March 1999, which are incorporated herein by reference.

Thermal Spray Technology And Processes

Traditionally, thermal spray techniques have demonstrated their capability to meet many of these requirements. In such processes, molten particles impact onto a substrate surface to the form a coating.

Thermal spray processes have relatively high coating rates due in part to their high-temperature heat sources. Additionally, such processes involve wide compositional ranges compared to other PVD or CVD coating processes. Coating materials formed thereby effectively serve as a new surface material added to the original surface (substrate).

Variants of thermal spray technology are capable of processing a wide spectrum of materials, thus making this technology an attractive choice of coating method. Metals from aluminum to tungsten, ceramics, polymers, and advanced composite materials are now being thermally sprayed. Interest in thermal spray processes and equipment has been stimulated by the versatility of the process, the demands of hostile operating environments and materials which need cohesive and adhesive coatings, and the development of new materials and surfacing concepts.

Thermal spray is limited, however, in that it is primarily a direct "line-of-sight" process where the incident droplets are deposited only onto surfaces that are aligned with the path followed by the incident droplets.

The Wire-Arc Spray Process

A wire-arc spray process is a type of thermal spray process that traditionally utilizes a DC electric arc to directly melt consumable electrode wires. This contrasts with other thermal spray processes which indirectly heat the particles with heated jets of gas. Thus, the thermal efficiency of the wire-arc spray is potentially higher than that of other thermal spray processes. In twin wire-arc spraying, the electric current is carried by two electrically conductive, consumable wires. An electric arc is created between the wire tips across a gap created by the continuous convergence of two wires. A gas jet blows from behind the converging electrodes and transports the molten metal that continuously forms as the wires are melted by the electric arc. High-velocity gas breaks up or atomizes the molten metal into smaller particles in order to create a fine distribution of molten metal droplets. The droplet-infused gas then accelerates the particles away from the electrode tips to a substrate surface, where the molten particles impact to incrementally form a coating upon cooling. Unlike combustion or plasma spraying, the droplets are already molten when they enter the jet zone, and are continuously cooled in transit to the substrate as the particles leave the arc zone. Thus, the optimized wire-arc spray process attempts to shorten the time in transit so that the cooling effects on the molten droplets do not reduce the amount of molten particles that are needed to form continuous coating layers.

Particles created by most conventional wire-arc spray processes tend to be larger and more irregularly sized than those found in powder-fed thermal spray coating processes. This size irregularity contributes to unwanted deposit porosity, which is common in many wire-arc spray coatings. Droplet atomizing irregularity also depends on uniformity in wire feed rates, the stability of electrical voltage and current, and nonuniformity in the arc gap. The attainment of high-density wire arc coatings is to some extent possible with careful control of wire feed rates, the use of smaller diameter wires, the application of lower currents and wire feed rates, and by experimenting with the atomizing gas-to-metal feed rate.

The consumable two wire-arc technique is responsible for the growth of metallizing as a commercial coating method, especially using aluminum and zinc alloys. Smith, supra, p. 23. Despite the wire arc's high deposit rate capability, it is limited to materials that are conductive and to those materials which are ductile enough to be formed into wire. This reduces the number of materials that are suitable for use in wire-arc processes. However, recent cored wire development has expanded the range of materials to include cermets and "hardfacing" carbide/oxide with metal matrices. Id. However, such advances still leave the unsolved problems of adhesion to the substrate and cohesion within an often porous coating.

The Cored Wire Electrode

Mechanical, e.g., folded, abutted, or lapped seams of the tube or sheath that contains a core powder found in conventional electrodes present problems when used in welding and thermal spray applications.

The longitudinal seams of sheaths formed in conventional processes are closed by the compression stress, which results from reduction operations. Once the forming and sizing are complete, these cored wire electrodes are traditionally wound on spools for feeding into the wire or welding apparatus, or into coils or some other packaging, including drums that contain the wire for stowage, shipping and application. This winding process may relieve the mechanical compression stress that provides the seam's integrity, causing the seam to open and release or spill the core contents. If the wire has low ductility, it may break. When the wire is being used for welding or thermal spraying, the apparatus includes a wire feed drive system, conduit/liners or guide tubes, welding nozzle/thermal spray front end and a power source. The wire is fed from its container through a set of drive rolls that apply a pinching effect to the wire, which can cause the seam to open. The wire also passes through a flexible conduit that protects and guides it from the spool or package payoffs to the welding or thermal spray gun (head). Any movement of the gun or flexible conduit will also bend the wire, and may cause the seam to open or brittle wire to break.

Open seams reduce the strength of the wire and allow the contents to spill. This tends to clog the conduit and reduce the effectiveness and performance of the torch/gun, create amperage drops, cause unpredictable feed and spray rates, allow binding in the contact tips and complete stoppage of the application.

Additionally, inconsistent seam integrity Will create problems with the transfer of electrical current across the anode-cathode gap. Electrical current primarily flows around the surface of the wire. In welding and thermal spray processes, the wire is energized at a point as close as possible to the arc to create the least electrical resistance, consistent current flow and to reduce heating of the wire. The current is transferred to or from the wire through electrical contact tips. The contact tips, which are normally copper or brass, have a very close tolerance and limited contact surface. Any interruption in current flow caused by an irregular shape of the wire will be manifest in complications with the weld deposit or thermal sprayed coating.

Further, sealed seams, when their integrity is weakened, may permit moisture to penetrate past the sheath/tube and become absorbed in the core material, which causes porosity in coatings, and porosity and hydrogen embrittlement in welds.

Deposit Characteristics

Coatings deposited by wire arc spray techniques generally contain pockets of metal that are thicker and more varied in size than those found in plasma spray coatings deposited by powder combustion and related conventional processes. Large areas of porosity may result from solid, larger particles being trapped, thereby creating voids that have not been filled by subsequent droplets. The conventional wire-arc spray deposit's coarser microstructure and porosity are often attributed to the large and irregular droplet sizes caused by wire-atomization irregularities. Wire arc spray coatings tend to be rougher than those formed by other thermal spray processes, especially where large diameter wires are used.

Wire-arc spray technology is suited to depositing layers of corrosion- resistant and conductive aluminum, zinc, their alloys, copper, and stainless steels at high rates (>15 kg/hr [33 lb/hr]).

Many municipal and civil structures such as bridges, water storage tanks and marine coatings for ship stacks and decks are coated with wire arc spray apparatus.

Against this background, there remains a need to eliminate or effectively reduce surface problems associated with high levels of oxidation, corrosion, and abrasion in industrial environments, including, but not limited to the power generation boiler environment, the paper and pulp industry digester, petro-chemical and chemical manufacturing processing equipment, turbo machinery get and steam turbine) and industrial combustion engines.

DISCLOSURE OF INVENTION

These and related challenges have led to the development by the inventors of a multiplex powder composite selected from a group of particle sizes consisting of micron ($1 \times 10^{-6}$ meters) and sub-micron (less than $1 \times 10^{-6}$ meters), including nano-scale ($1 \times 10^{-9}$ meters) particles for a core material in a sheath that serves as an electrode in a wire arc spraying or welding apparatus.

The cored wire electrode manufacturing process involves taking a flat metallic strip material, forming it into a "U" shape, filling it with the granular or powder core material, then roll forming it into a tube and reduction drawing or rolling it to a suitable size for welding or thermal spraying applications. See, e.g., commonly owned U.S. Pat. No. 5,479,690 which is incorporated herein by reference.

The process for manufacturing a sheath or welded seam product requires changes in conventional procedures in order to address issues that are inadequately addressed by traditional methods. The first problem is how to continuously form a tube and weld the seam. The second challenge is how to get particles in the sheath during the forming and seam welding operation without affecting the quality of the weld or the quality of the core material. Good results have been obtained in manufacturing by orienting the sheath in a vertical position using forming dies, guide rollers, pinch rolls for welding and a fill tube that allow deposit of the core material at a point beyond the welding operation. See, e.g., commonly owned U.S. Pat. Nos. 5,346,116; 5,328,086; 5,479,690, which are incorporated herein by reference.

The seamless tube or sheath and the composite particles when sprayed provide a more dense coating than is currently available with conventional wire arc thermal spray materials. The added efficiencies, the ability to gain greater reductions, and core compaction enable a cored wire to be made that contains less than 10% voids by volume and a relatively uniform particle distribution. Additionally, chemistries can be balanced based on the sheath and core material, which enhance the versatility and effectiveness of the wire in producing the desired coating or weld.

The advantages of a multiplex composite powder core material that is encased in a seamless tube or sheath include:

Elimination of moisture absorption problems within the core material, which permits the use of liquid and near liquid drawing lubricants and cleaning agents and tends to reduce porosity;

Improved feeding;

Containment of the core material, which eliminates powder loss and voids in the multiplex composite;

Greater wire ductility;

Reduced apparatus down time for maintenance;

More consistent electrical current transfer and therefore arc stability;

Enhanced drawing/reduction capabilities;

Better compaction of core material, which manifests itself in a more consistent and balanced coating chemistry, density, and particle distribution; and Sintering of the core material during an annealing step, thereby eliminating the need for a separate sintering operation.

BEST MODE FOR CARRYING OUT THE INVENTION

Figure 1:
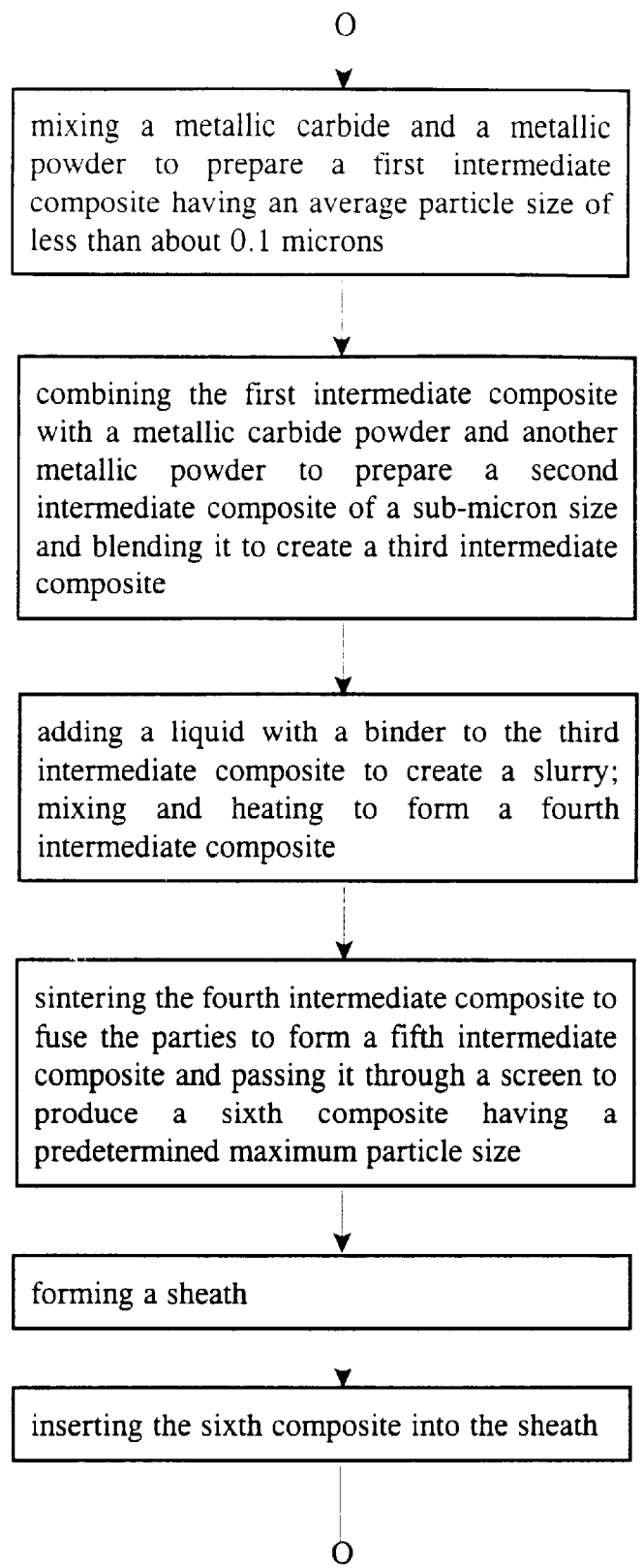
FIG. 1 is a process flow diagram of the main steps in manufacturing the cored wire electrode of the present invention.

The present invention relates to a cored wire electrode that has a sheath with a multiplex composite powder contained therein, its preparation method, and its method of use in arc-spraying and welding.

The Multiplex, Composite Powder

The multiplex core structure basically includes a selection of micron sized (average diameter about $1\times10^{-6}$ meters—"specie (A)") and sub-micron sized (average diameter less than about $1\times10^{-6}$ meters—"specie (B)"), including nano-scale (average diameter about $1\times10^{-9}$ meters—"specie (C)") powder materials (dimensions expressed in their uncoated form) which facilitate compaction in the initial stages of reduction of the cored wire.

More specifically, the multiplex core structure is a composite selected from a group consisting of two species of powders, where each specie is defined as follows:

| Specie | Termed | Approx. Diameter in Microns ($1 \times 10^{-6}$ meters) | Approx. Percent By Weight[1] |
|---|---|---|---|
| A | Micron | $\geq 1$ | 50–85 |
| B | Sub-micron | <1 | Balance |

[1]Unless otherwise stated, all percentages herein are expressed as weight percent.

The balance of sub-micron sized particles (specie (B)) includes about 15–50% by total weight of nano-scale materials, (specie (C)).

By developing a multiplex composite with the approximate sizes and amounts shown, there results an even distribution of the core material and equal reduction of the sheath thickness. The composite material allows the smaller particles to move in relation to the coarser particles as the sheath passes over them during the reduction steps, thus eliminating clumping or island-void problems that may result from the core material becoming stiff and separating in islands (or clumps) with voids therebetween.

The composite core material includes a selection of particles of one or more from the group consisting of metallic particles, non-metallic particles, and metal-encapsulated non-metallic particles that engage in the arc of a wire arc spraying or welding apparatus by becoming electrically charged.

This is accomplished by coating the coarse carbides with sub-micron and/or nano-scaled particles and with a metallic layer such as Co, Ni, Al to give them a metal surface. These materials when processed and inserted into the tube (or sheath) provide surface contact across the full cross-section of the tube. As the material is compacted by drawing down the outside diameter of the sheath, contact between the particles becomes tighter, thus promoting electrical flow across each particle, even if the particle is non-conducting in its uncoated form, and the sheath that contains the powder.

During thermal spraying, as the carbides melt and go into solution, the release of carbon reacts with atmospheric oxygen, thereby creating a protective layer or blanket of carbon dioxide in the ambient environment of the particle. This blanket protects the effluents from oxidation while in transit to the substrate. One benefit is elimination of most of the oxides (reduced to less than about 2% by weight) that are normally found in deposits created by arc wire and thermal spray coatings.

The ability to transfer electrical current across the surface of, and between all the particles results in full engagement of particles with the arc. Without wishing to be bound by any particular theory, it is thought that the influence of the arc on the metallic surface of the non-metallic carbide particles and/or the exothermic reaction of Co, Ni, and Fe generates heat energy surrounding the particle which enables the carbides to completely melt, go into solution and revert to a metallic phase.

An example of how the powder for the cored wire is prepared is described below with quantitative data that are illustrative and should not be construed as limiting:

a) To prepare the sub-micron components, tungsten carbide (WC) and cobalt (Co) powder of an average particle size of about 45–70 microns that contains by weight about 5–15% Co are milled to an angular morphology and size of less than about 0.1 microns to form a first intermediate composite.

b) The first intermediate composite is then combined with a coarse grain (about 1–45 microns; i.e. $(1-45)\times10^{-6}$ meters) WC powder that contains about 5–20% Co, and another metal (e.g., Cr, Ni, or Mo) powder of any morphology in a sub-micron size to form a second intermediate composite. The components are then blended at room temperature to create a uniform particle distribution, comprising a third intermediate composite.

c) De-ionized water is then added with a binder or glue (e.g., polyvinylpropylene (PVP), latex, polyurethane, etc.) to create a slurry which is then mixed thoroughly, and heated to dry the mix to a powder to form a fourth intermediate composite.

d) The composite powder is then sintered to fuse the smaller components onto the larger components to create a fifth intermediate composite. The sintered mass is then passed through a screen (sized about 270 mesh, i.e., about $53\times10^{-6}$ meters) to produce a multiplex powder (sixth composite) having a predetermined maximum particle size before insertion into a tube. Other sieve designations may be used; see, e.g., ASTM E-11, which is incorporated by reference.

The resultant average particle size is about 1–55 microns (i.e., $(1-55)\times10^{-6}$ meters). The powder is a multiplex composite of about 50–90% carbide and 10–50% Co or other metal. Preferably, the multiplex composite particle, upon sintering, includes a WC particle that is coated with Co that, in turn, is coated with one or more other nano-sized WC-Co particles that are themselves coated with Co. If desired, the combination itself may be coated with a metallic layer. The powder morphology of the raw carbides is generally angular, the raw metals are provided in any shape, and final composite powder tends to be approximately spherical. The spherical morphology of the final composite powder enables material to flow during tube compaction, thereby allowing a relatively homogeneous mix of particles to exist in the sheath.

The nano-scale particles occupy the spaces between the coarser particles to create a dense structure. When compressed in the tube (sheath or wire), this structure creates a physical or closely adjacent surface contact of each particle which allows a direct electrical current to flow across each particle, permitting it to become energized and melt while engaged in the electrical arc.

Although WC is disclosed as a constituent of the multiplex powder, it will be appreciated that other carbides of Group IV, V, and VI of the periodic table may be used instead of all or some of the WC.

In more detail, and as additional example, the steps taken to produce the powder are:

Step 1: Add the required weight percent of material (see, e.g., step (a) above) into a seasoned bowl at room temperature (about 65–75° F.). Lower a planetary mixing head (the assembly which includes the mixing blades, e.g., of a planetary mixer made by Ross Engineering of Savannah, Ga.) and dry mix the material for about 15 minutes.

Step 2: Add the pre-mixed binder (glue), which generally is water soluble, to the mix. Add de-ionized water until a cream-like consistency appears. When the mixture is fully "wet", heat the bowl by introducing steam into a jacket around the bowl. The bowl temperature is generally around 250–400° F. Dry times are between about 40 and 90 minutes. Dry times are dependent on the ambient humidity and blade speed. Blade speed is kept relatively low so as not to dislodge any already agglomerated particles. After the drying cycle, the material is in a powder form and mostly free from fine dust.

Step 3: Remove the powder while it is still warm (at about 100° F. to reduce any moisture pick-up from the surrounding area) and place it into a portable hopper. The powder is then loaded into boats (crucibles) either made of a high temperature nickel chrome molybdenum alloy or preferably in a crucible which has a nominal composition of aluminum oxide or yttrium-stabilized zirconium. The powder is then heated in a hydrogen environment to about 1800–1850° F. The fifty degree differential is maintained for about one hour. Sintering removes the binder and fuses the agglomeration (composite) powder particles together. Sintering results in a powder that is free flowing and dense.

Step 4: This free flowing and dense powder is now ready for bulk blending.

This process combines all the powder manufactured in separate bowls and sintering crucibles into one homogenous "lot" of material which is then scalped (screened to a particular particle size). The powder is now ready to be used in an otherwise conventional thermal spray or powder welding (PTA or laser) machine. By loading it into a tube (sheath) for making the multiplex composite powder core thermal spray and welding wire.

The Sheath Material

The sheath material is, in one example, about 1" wide (2.54 cm) and about 0.032" (0.08 cm) thick. It may be of any weldable alloy, again (preferably) in the annealed condition for ease of forming. Examples are (approximate percentages by weight):

| Alloy Designation (Hoskins No.) | Nominal Composition (weight percent) | | | | | | |
|---|---|---|---|---|---|---|---|
| | Ni | Cr | Fe | Mn | Al | Mo | Ta + Cb |
| 600 | Bal. | 15.5 | 8.0 | 0.5 | — | — | — |
| 522 | Bal. | 1.5 | — | 2.0 | — | — | — |
| 126 | Bal. | 20.0 | 2.0 | — | 4.0 | — | — |
| 625 | Bal. | 21.5 | 2.0 | — | — | 9.0 | 3.5 |

The Cored Wire Manufacturing Process

One example of the main steps in the wire manufacturing process is described below with quantitative data that are illustrative and should not be construed as limiting:

i) Install a ribbon or strip having longitudinal edges of the sheath material on an apparatus with guides and forming dies arranged to form the sheath into a "U" shape. See, e.g., commonly owned U.S. Pat. No. 5,479,690.

ii) Insert a filling tube that communicates between a powder container and the inside of the sheath. The filling tube has an outside diameter clearance tolerance that permits the completely formed sheath to feed without interference. The filling tube is of sufficient length to deposit the powder below the point of welding the longitudinal edges of the ribbon or strip.

iii) In a continuous operation, the "U"-shaped sheath with the filling tube inserted receives final forming into a tube shape by passing it through forming rolls at a feed rate, for example, of 18" (or 46 cm) per minute into a pinch roll arrangement that aligns and closes the seam for welding.

iv) A welding head is mounted adjacent to the pinch point between the pinch rolls, which provides a continuous seam weld. As an example, the welding current requirement is 50–60 amps under a potential difference of 8 to 10 volts.

v) The formed and welded sheath has, for example, an outside diameter of about 0.318" (or 0.81 cm) and is then passed through a reduction and rounding die (e.g., to about a 0.312" (0.80cm)) dia. core wire. It is then coiled for further processing.

vi) At room temperature the wire is reduction-drawn to about 0.120" through various reduction steps.

vii) At about 0.120", the wire is cleaned in a n alkali cleaner and annealed in a controlled, reducing or inert atmosphere to a suitable temperature and feed rate using an in-line annealing furnace. Then the wire is submerged or bathed in a pre-coating (e.g., Dyna-co at) solution for about 20 minutes.

viii) At room temperature, the wire is then reduction drawn to a final size of either about 0.093" (3/32" or 0.24 cm) or about 0.062" (1/16" or 0.16 cm) through various reduction stages.

The seamless tube (formed sheath) provides for full and complete compaction of the particles, without separating or allowing the seam to open during processing or in operational use. Seam integrity affects the successful performance of the disclosed wire because, as noted earlier, an open seam will allow loss of powder. This would create feeding problems, sporadic arc engagement problems, discontinuities in the applied coating, and might allow moisture to penetrate the core material.

The Wire Arc Spray Process

In practice, the reaction of clad and sintered WC-Co material in the arc causes the inert carbide to go into solution, generate its own shielding in the form of carbon dioxide and convert it to a predominately metal form. Experiments have been done using WC-Co as the core material. The inventors believe this phenomenon can be reproduced using any form of metal carbide that is processed with Co or the like, and sintered in a similar manner to that disclosed herein.

Suitable combinations of sheath and powder compositions include (by weight percent, ±5 percent):

| | Initial Wire | | | | As-Deposited | |
| | Sheath Alloy | | Powder | | Coating | |
| Example | Element | Amount | Element | Amount | Element | Amount |
|---|---|---|---|---|---|---|
| 1 | Ni | Balance | WC | 85 | W | Balance |
| (Preferred) | Cr | 15.5 | Co | 15 | Ni | 21 |
| | Fe | 8.0 | | | Cr | 12 |
| | Mn | 0.5 | | | Co | 10 |
| | | | | | Fe | 6 |
| 2 | Ni | Balance | TiC | 30 | Ni | Balance |
| | Cr | 1.5 | Cr | 20 | Al | 25.0 |
| | Mn | 2.0 | Al | 50 | Cr | 21.5 |
| | | | | | Ti | 15.0 |
| | | | | | Mn | 1.0 |
| 3 | Ni | Balance | ZrC | 85 | Zr | Balance |
| | Cr | 1.8 | Co | 15 | Ni | 21 |
| | Mn | 2.0 | | | Cr | 12 |
| | | | | | Co | 10 |
| | | | | | Mn | 2 |
| 4 | Fe | Balance | TiC | 85 | Ti | Balance |
| | C | 0.30 | Al | 15 | Fe | 44.5 |
| | Mn | 0.60 | | | Al | 7.5 |
| | Si | 0.80 | | | Si | 0.4 |
| | | | | | Mn | 0.3 |
| 5 | Ni | Balance | CrC | 85 | Cr | Balance |
| | Cr | 15.5 | Ni | 15 | Ni | 47.0 |
| | Fe | 8.0 | | | Fe | 4.0 |
| | Mn | 0.5 | | | | |

As of the filing date of this patent application, examples 2–5 are prophetic.

The As-Deposited Coating

One result of the disclosed process is a dense, low oxide coating that is predominantly a refractory metal, which is both corrosion-and abrasion-resistant.

As used herein, the term refractory metal includes a metal having an extremely high melting point—for example, tungsten, molybdenum, tantalum, niobium (columbium), chromium, vanadium and rhenium. More broadly stated, this term refers to metals having melting points above the range for iron, cobalt, and nickel. In a more general sense, the refractory alloys as constituents of the as-deposited coating have the characteristics of being heat-resistant, exhibiting an extremely high melting point, and being generally difficult to work at elevated temperatures using traditional approaches. Traditionally, refractory metals have been difficult to manufacture in continuous wire form due to their physical properties; e.g., they are brittle, highly reactive, and have high melting points. Also, refractory elements by themselves following conventional teachings, have oxidized during spraying and welding. The present invention provides coatings of suitable refractory alloys that are resilient to the effects of high levels of oxidation, corrosion and abrasion.

The chemistry of the sprayed coating differs from the chemistry of the wire and its core. The coating structure is ductile, chemically resistant at elevated temperatures, and low in porosity.

Since the wire of the subject invention is powder-cored, any material that is available in powder form having the disclosed range of particle sizes (preferably including a refractory metal) can be used. Because of the reaction created during spraying and welding, alloying of all the constituents in the wire and sheath is accomplished in and under a protective $CO_2$ environment. This phenomenon minimizes oxidation. Hence, few oxides exist in the deposited coating.

Also, in the deposited layer, there is little porosity. This provides a coating whose density will allow it to be used where corrosive liquid and gases are present, in contrast to conventional thermal spray arc coatings.

As an example, W-based alloys are conventionally applied in a vacuum with coating porosity of about 10–12% by volume. But the present invention produces a similar W-based alloy coating when applied in ambient air using commercially available equipment with a porosity level of about 1.5 to 2.5% by volume.

Thus, the invention involves the manufacture and deployment of a multiplex composite powder-cored wire which contains refractory elements in their carbide phase in the core and other alloying elements which are contained in the core and/or outer shell or sheath. Such cored wires are introduced to a high energy electric arc, like those found in thermal spray arc applications and gas-metal arc welding, gas-tungsten arc welding, and plasma arc welding. The material containing the carbide phase controls the releasing of carbon and combines with atmospheric oxygen to form $CO_2$. This reaction converts the carbides back to their respective metal phases and simultaneously alloys them with the sheath chemistry to form a coating or weld which contains high levels of alloyed refractory elements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cored wire electrode for a thermal spray or welding apparatus, comprising:
    a sheath; and
    a multiplex powder composite that is contained within the sheath before the sheath is exposed to an electrical current in a thermal spray or welding environment, the composite comprising:
        a powder with a group of particles consisting of
            specie (A), comprising micron sized particles having an average diameter of about $1 \times 10^{-6}$ meters and
            specie (B), consisting of sub-micron sized particles,
                specie (B) including specie (C), comprising nano-scale particles having an average diameter of about $1 \times 10^{-9}$ meters, and specie (1), also comprising particles sized between specie (A) and specie (C),
        species (A) and (B) mechanically cooperating to promote smooth powder flow, which facilitates compaction of the cored wire,
    wherein the multiplex powder composite has the characteristics of relatively uniform density,
    wherein the particles of specie (C) move relatively easily in relation to those particles of specie (A) during compression of a sheath in which they are contained during mechanical reduction steps to which the sheath is subjected in manufacture of the cored wire electrode, thus reducing clumping or island-void problems that may adversely affect stiffness or malleability of the cored wire electrode.

2. The cored wire electrode of claim 1, further comprising about 50–85 weight percent of specie (A).

3. The cored wire electrode of claim 1, further comprising about 15–50% by weight of specie (C).

4. The cored wire electrode of claim 1, wherein the multiplex powder composite includes particles selected from of one or more from the group consisting of metallic particles, non-metallic particles, metal-encapsulated non-metallic particles, and mixtures thereof that are engageable in an arc of a wire arc spraying or welding apparatus by becoming electrically charged.

5. The cored wire electrode of claim 1, wherein particles of specie (A) are coated with a metallic layer, the layer consisting of a metal selected from the group consisting of Co, Ni, Al, and mixtures thereof, to imbue the particles with an electrically conducting surface, so that when the multiplex powder composite is enveloped in a sheath, there results an inter-particle mechanical and electrical contact, thereby promoting electrical flow across each particle and through a cross section of the sheath, even though some particles are non-conducting in their uncoated form.

6. The cored wire electrode of claim 1, wherein particles of specie (B) are coated with a metallic layer, the layer consisting of a metal selected from the group consisting of Co, Ni, Al, and mixtures thereof, to imbue the particles with an electrically conducting surface, so that when the cored wire electrode is enveloped in a sheath, there results an inter-particle mechanical and electrical contact, thereby promoting electrical flow across each particle and through a cross section of the sheath, even some particles are non-conducting in their uncoated form.

7. The cored wire electrode of claim 1, wherein particles of species (A and B) are coated with a metallic layer, the layer consisting of a metal selected from the group consisting of Co, Ni, Al, and mixtures thereof, to imbue the particles with an electrically conducting surface, so that when the cored wire electrode is enveloped in a sheath, there results an inter-particle mechanical and electrical contact, thereby promoting electrical flow across each particle and through a cross section of the sheath, even though some particles are non-conducting in their uncoated form.

8. The cored wire electrode of claim 1, wherein the average particle size of the composite is about 1–55 microns and the composite comprises about 50–90% of a carbide and a balance of a metallic phase.

9. The cored wire electrode of claim 1, including particles consisting of carbides of metals selected from the group consisting of Group IV, V, and VI of the Periodic Table that are coated with Co, Ni, Al, and mixtures thereof that, in turn, are coated with one or more other nano-sized carbide particles that are themselves coated with Co, Ni, Al, and mixtures thereof to form an intermediate coated composite.

10. The cored wire electrode of claim 9, wherein the intermediate coated composite is coated with a metallic layer comprising Co, Ni, Al, and mixtures thereof.

11. The cored wire electrode of claim 1, including particles consisting of WC particles that are coated with Co that, in turn, are coated with one or more other nano-sized carbide particles that are themselves coated with Co.

12. The cored wire electrode of claim 1, including particles consisting of TiC particles that are coated with Cr and Al that, in turn, are coated with one or more other nano-sized carbide particles that are themselves coated with Cr and Al.

13. The cored wire electrode of claim 1, including particles consisting of ZrC particles that are coated with Co that, in turn, are coated with one or more other nano-sized carbide particles that are themselves coated with Co.

14. The cored wire electrode of claim 1, including particles consisting of TiC particles that are coated with Al that, in turn, are coated with one or more other nano-sized carbide particles that are themselves coated with Al.

15. The cored wire electrode of claim 1, including particles consisting of CrC particles that are coated with Ni that, in turn, are coated with one or more other nano-sized carbide particles that are themselves coated with Ni.

* * * * *

UNITED STATES PATENT AND TRADEMARK OFFICE
CERTIFICATE OF CORRECTION

PATENT NO. : 6,674,047 B1
DATED : January 6, 2004
INVENTOR(S) : Joseph Paul Hughes et al.

It is certified that error appears in the above-identified patent and that said Letters Patent is hereby corrected as shown below:

Column 10,
Line 46, delete "specie (1)" insert therefor -- specie (B) --.

Signed and Sealed this

Fifteenth Day of June, 2004

JON W. DUDAS
*Acting Director of the United States Patent and Trademark Office*